March 23, 1971     J. W. JOHNSON     3,572,111
SYSTEM FOR NONDESTRUCTIVE TESTING OF ROADS AND THE LIKE
Filed Sept. 18, 1969
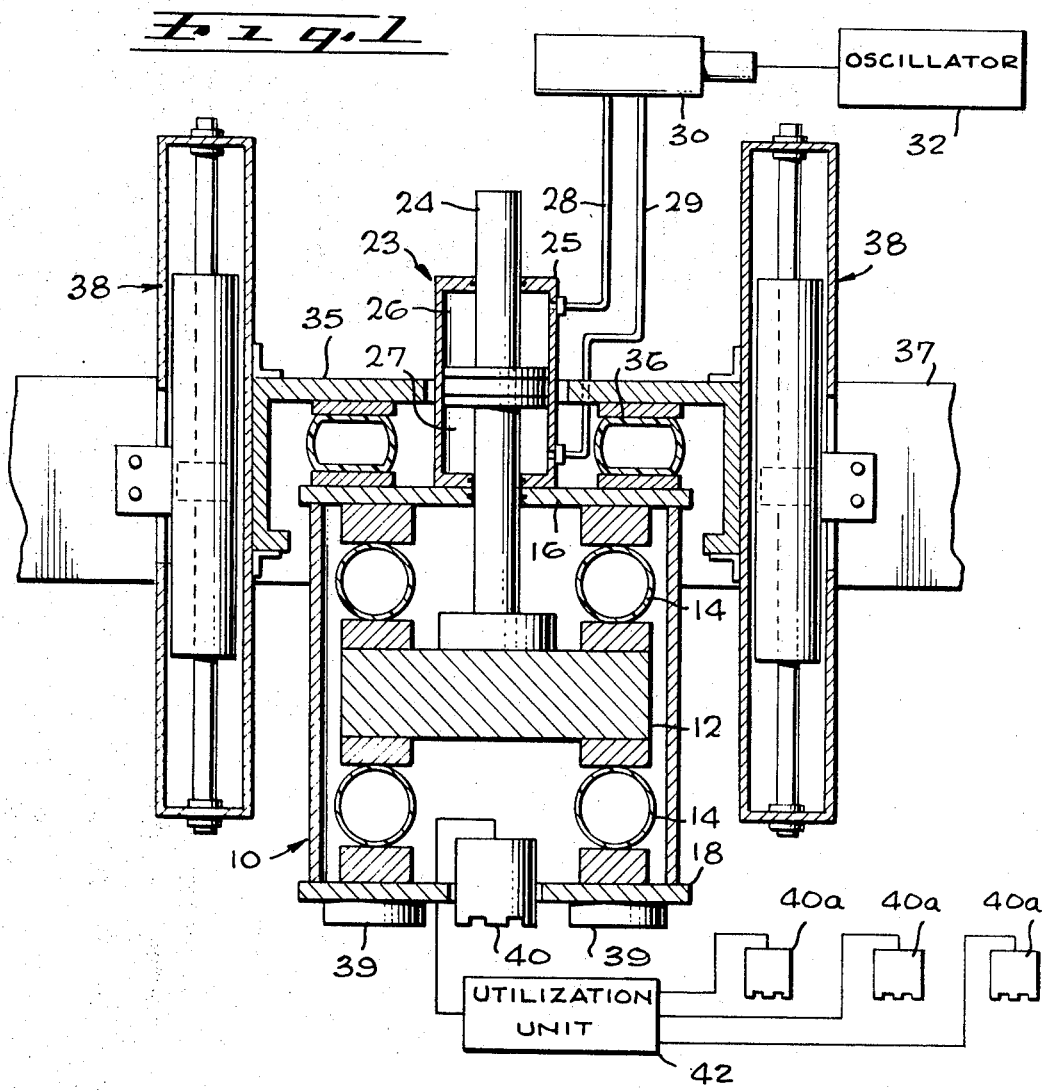
INVENTOR.
JOHN WILLIAM JOHNSON
BY *Lindenberg & Freilich*
ATTORNEYS United States Patent Office 3,572,111
Patented Mar. 23, 1971

3,572,111
SYSTEM FOR NONDESTRUCTIVE TESTING OF
ROADS AND THE LIKE
John William Johnson, Manhattan Beach, Calif., assignor to Foundation Mechanics, Inc., El Segundo, Calif.
Filed Sept. 18, 1969, Ser. No. 859,065
Int. Cl. E01c 19/30
U.S. Cl. 73—146
10 Claims

ABSTRACT OF THE DISCLOSURE

A nondestructive road testing system comprising a housing in which a vibratory mass is positionable at a null position by means of sets of balanced air springs. The housing is coupled to the bumper of a vehicle, such as a truck, through hydraulic elevator cylinders, which lower the housing onto a test surface and raise it therefrom. The housing supports a sensor which comes in contact with the test surface when the housing is positioned thereon, thereby applying a static force thereto. The force produces a deflection in the surface which is sensed by the sensor and which is measured and/or recorded. The vibratory mass is coupled to a piston in a double chamber hydraulic actuator. A sinusoidal alternating current from an electrical oscillator is supplied to a control valve which in turn controls the oscillation of the piston and the mass coupled thereto by controlling the supply of fluid to the hydraulic actuator. The oscillating mass produces a dynamic force which is applied to the test surface, with the resulting deflections being sensed by the sensor.

BACKGROUND OF THE INVENTION (1) Field of the invention

The present invention generally relates to vibration-producing equipment and, more particularly, to a system for nondestructively testing and determining pavement and foundation strength characteristics.

(2) Description of the prior art

The need for a rapid, yet reliable, nondestructive test system for determining pavement and foundation strength characteristics has long been evident. For example, the strength characteristics of distressed sections of roads or air-strips must be known for proper overlay design, in order to withstand known or expected traffic conditions. It has become an accepted and basic principle that failure in a normal pavement section is commonly caused by excessive deflection of the pavement, imposed by repetitive traffic loading. Thus, distressed pavement sections, representing sections with unsatisfactory strength characteristics, may be discovered by determining the deflection properties of the pavement.

It has further become known that the strength characteristics are indicated by the maximum amount of deflection as well as by the shape of the affected area, or deflection basin. It has further been discovered that most meaningful strength data may be obtained by determining the maximum deflection and the deflection basin produced in response to static as well as dynamic loading.

Herebefore, various methods have been developed to obtain pavement deflection data. Originally, deflection measurements were made by permanently installed gauge units. This original technique was supplemented by manually-operated devices, such as the Benkleman beam and the traveling deflectometer. One of the basic disadvantages of these devices is that they require several trained people for their operation, and that the recordation of the pavement deflection at any given point requires a significant period of time. Consequently, the cost of testing pavement per unit length is quite high. Also, these devices are incapable of recording deflection, due to both static and dynamic loading.

Thus, a need exists for a new improved system for determining pavement strength properties by testing, detecting and recording maximum deflection and deflection basins in the pavement which is subjected to both static and dynamic loading. It is further desired that the system require a minimum of operation personnel and one, which is capable of speedy operation, so as to minimize the cost of pavement testing per unit length.

OBJECTS AND SUMMARY OF THE INVENTION

It is a primary object of this invention to provide a new system for determining pavement strength characteristics.

Another object of the invention is to provide a novel system for determining pavement deflection, subject to static and/or dynamic loading.

A further object of the invention is to provide a reliable, easily operable system for subjecting pavement and the like to static and/or dynamic loading and recording signals, indicative of pavement deflection.

These and other objects of the present invention are achieved by a system which includes a frame and housing assembly in which a vibratory or oscillatory mass is supported at a preselected null position in the housing assembly, by means of two sets of air springs, disposed on opposite sides thereof. One set of springs is between the bottom side of the mass and the bottom plate of the housing, while the other set is between the top side of the mass and the top plate of the housing. The housing top plate is coupled through air springs to a frame which in turn is connected to a bumper or other appropriate part of a movable vehicle, through hydraulic elevator cylinders. The housing bottom plate supports several contact pads and a sensor, which come in contact with the pavement, whenever the housing is lowered thereonto from the vehicle, by means of the elevator cylinders. The static load which is applied to the pavement is provided by the housing weight plus any additional force which may be provided by lifting a portion of the truck's weight, by means of the elevator cylinders.

The system further includes a hydraulically activated piston, mounted in a double-chamber cylinder. The piston is connected to the vibratory mass. The double chamber cylinder is connected to an electrohydraulic directional control valve, which is driven by a sinusoidal alternating current. Consequently, the piston and, therefore, the vibratory mass reciprocate or oscillate up and down within the housing about the null position of the mass. When the mass is forced downwardly, it increases the load applied to the pavement, while decreasing it when traveling upwardly. Thus, a dynamic load is applied to the pavement.

Ground deflections are sensed by the sensor, located at the center of the pavement area, at which the load is applied. By incorporating additional sensors, the deflections at desired incremental distances from the point at which the force is applied, may be sensed. These deflections may be measured to enable the plotting of the deflection basin. Velocity sensors may be used to sense deflections due to dynamic loading, while sensors of the linear variable differential transformer (LVDT) type may be employed to sense both static and dynamic deflections.

The novel features of the invention are set forth with particularity in the appended claims. The invention will best be understood from the following description when read in conjunction with the accompanying drawings.

BRIEF DESCRIPTION OF THE DRAWINGS

FIG. 1 is a general block and cross-sectional view of various parts comprising the system of the present invention;

FIG. 2 is a simple diagram of manifold air springs; and

FIG. 3 is a simple side view diagram of another embodiment of the invention.

DESCRIPTION OF THE PREFERRED EMBODIMENTS

Reference is now made to FIG. 1 wherein the novel system of the present invention is shown comprising a housing 10, wherein a mass 12 is supported by means of two sets of resilient compressible members, such as air springs, designated by numeral 14. One set of springs is connected between the upper side of mass 12 and the top plate 16 of housing 10, while the other set is connected between the bottom side of the mass 12 and the bottom plate 18 of housing 10.

Preferably, as shown in FIG. 2, each set consists of three springs which are manifolded together for pressurization from an air source 20, through a shut-off valve 22. Such an arrangement provides convenient means for balancing the forces which are applied to opposite sides of the mass 12, so that in the absence of any other forces applied thereto, the mass assumes a chosen null position, such as the housing's mid-point.

The system further includes a double-chamber hydraulic actuator 23 comprising a piston 24 which divides a cylinder housing 25 into two chambers 26 and 27. The chambers are connected by means of hydraulic conduits 28 and 29, respectively, to an electro-hydraulic valve 30. The piston 24 is connected to the mass 12. The valve 30 is assumed to be connected to a source of hydraulic pressure (not shown) and to a source of electrical signals, such as oscillator 32.

The oscillator 32 is assumed to supply a sinusoidal alternating current which causes the hydraulic fluid in the conduits 28 and 29 to vary in accordance with the current. The sinusoidally varying pressure in the two chambers 26 and 27 in turn causes the piston 24 to oscillate sinusoidally, up and down. Since the piston is connected to mass 12, when the oscillator 32 is in operation, the mass 12 is displaced sinusoidally up and down about its null position, which it assumes as a result of the forces applied thereto by the two sets of the air springs 14. Thus, no electrical position feedback to the valve 30 is required.

The housing 10 extends downwardly from a frame 35, through support springs 36. The frame 35 is connected to a movable vehicle, represented in FIG. 1 by its front bumper 37 through a pair of hydraulic elevator cylinders 38. The latter, when activated, raise or lower the frame 35 and, therefore, the housing 10 with respect to the vehicle to facilitate the lowering of the housing onto the test surface, such as a road, any other pavement, foundation or the subgrade prepared for paving. The housing 10 has a pair of contact pads 39 attached to its bottom plate 18. The housing further supports a sensor 40, centrally disposed in the bottom plate 18. It is the contact pads and the sensor which come in contact with the test surface when the housing is lowered thereonto. Any force or load to the surface is applied through the contact pads and any surface deflection, resulting therefrom, is sensed by sensor 40. The latter is assumed to be connected to a display meter and/or a recorder both of which are represented in FIG. 1 by block 42, labeled Utilization Unit.

In operation the housing 10 is lowered to the test surface by means of cylinders 37 which cause the pads 39 and sensor 40 to come in contact with the surface, thereby applying a static load or force thereto. The static force is variable from the weight of the unit itself to approximately ½ the weight of the mounting truck, by operating the elevator cylinders 38 so that the truck's front wheels are off the pavement. The deflection resulting in the test surface from the static load is sensed by sensor 40 and is supplied to unit 42. Thereafter, the oscillator 32 is turned on, causing the mass 12 to be sinusoidally displaced up and down about its null position. The frequency of vibration or oscillation may vary from nearly D.C. to several hundred cycles, e.g., 200 Hz.

The dynamic force resulting from the oscillating mass has positive and negative vertical components. When the mass moves downwardly, the downward force adds to the static force applied to the surface, while when the mass travels upwardly, the vertical force subtracts from the static force. It should be pointed out that for proper operation of the system, the static force which is applied should not be less than the vertical upward force, produced by the vibrating mass, in order to insure that the pads 39 and the sensor 40 are continuously in contact with the test surface. The deflections in the surface, produced by the dynamic force are also sensed by sensor 40 and supplied for display and/or recordation to unit 42.

From the foregoing it should be appreciated that since sensor 40 is located between pads 39 it senses the deflection at the center of the applied forces. Deflections at distances from the center of the force application may be sensed by additional sensors, designated in FIG. 1 by numeral 40a which may be spaced from sensor 40 and from each other in any desired relationship. These sensors are assumed to be connected to unit 42. The deflections sensed by sensor 40 and sensors 40a are sufficient to plot the deflection basin produced in the test surface by the static and dynamic forces applied thereto.

Preferably, the additional sensors 40a may be supported by an arm 45 as shown in FIG. 3 which is assumed to be hingedly supported by housing 10. Such an arrangement facilitates the speedy lowering of the sensors 40a to come in contact with the test surface when the housing is lowered to the surface. Once the measurement is completed, the arm is pivoted toward the housing to raise the sensors 40a off the surface, while at the same time the housing is raised to enable the truck to move to a second measurement location.

From the foregoing it should be apparent that the novel system of the present invention is capable of producing static and dynamic deflection in a test surface. The static force, producing the static deflection, may be varied by varying the portion of the truck weight which contributes to the static force. Also, the frequency and amplitude of the dynamic forces may be varied over a broad range by varying the amplitude and frequency of the oscillator 32, thereby varying the frequency and peak-to-peak oscillation of the mass 12.

The housing of the system is attachable to a vehicle, such as the truck, shown in FIG. 3, and all the control circuits are installable in the truck cabin. As a result, a trained truck driver, representing a crew of one (1), is needed to operate the system. The system is relatively small and inexpensive when compared with prior art systems. In one particular embodiment, which was actually reduced to practice and which produced satisfactory results, the housing weight was about 350 pounds and that of the vibrating mass 12 was in the range of 150 pounds. The time required for the measurement at any given point is in the range of a few seconds. Thus, the truck may be driven at nearly normal highway speeds and thereby not disturb normal traffic flow.

These novel advantages of the present invention become apparent when comparing the present system with prior are systems such as the Benkleman beam which is the most commonly used device for measurement of pavement deflection under loading, and which operates on a level arm principle. In such a system a long probe is inserted between tires of a truck which carries a 15,000 pound single axle load. As the truck is driven at a very low speed, the pavement is depressed and the probe pivots around a point of rotation on a reference beam, which rest on the pavement several feet from the truck's wheels. A dial indicator, which is observed manually, shows the relative displacement between the probe and the reference beam.

Such a device which generally requires a crew of three men, only indicates total deflection at one point and the rate at which the truck moves influences the test results due to the rate of response of the pavement to the moving truck. Also, the system is slow and the results subject to human errors. Furthermore, the reference beam rests only a few feet from the load point when a zero reference is set. Since at this point the pavement already assumes a deformed position, the set point is not a true zero reference point.

Another prior art machine, known as the Travelling Deflectometer, is an automatic deflection measuring device based upon the Benkleman beam principle. It combines a truck-trailer unit which carries a 15,000 pound single axle load on the rear tires and probes for measuring pavement deflection simultaneously under both wheels. The deflectometer is an electro-mechanical machine providing chart recorded deflections at 20 feet intervals while traveling at ½ mile per hour. The basic problems with this machine are its great size and expense. It also provides only total maximum deflections to a basically static input. It is also slow and causes major traffic interference.

Still another prior art machine operates on electro-mechanical principles and produces dynamic deflections by rotation of eccentric masses. It is trailer mounted and its input to the test surface is through two steel wheels. It operates at a fixed frequency and fixed force input. Deflections are sensed using one or more geophones. The disadvantages of this machine are that it cannot be used to measure static deflections and neither the dynamic force nor frequency are variable.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. A system for determining deflections in a test surface, subjected to load forces which are applied thereto comprising:
   a vehicle, movable over said test surface;
   a housing having a bottom end and an opposite top end;
   housing position control means coupled to said vehicle and to said housing for controlling the housing position with respect to said vehicle and for controlling the lowering of said housing to said test surface and the static force which said housing bottom end applies to said surface when in contact with said surface;
   a reaction mass positioned in said housing;
   vibration means coupled to said reaction mass for vibrating the latter between the housing ends at a selected frequency and amplitude to dynamically vary the force applied to said surface;
   resilient biasing means for supporting said reaction mass between said housing ends at a null midpoint position in the absence of vibrating forces from said vibration means; and
   output means for sensing and indicating the deflections in said test surface produced as a result of the static and dynamic forces applied to said test surface.

2. The arrangement as recited in claim 1 wherein said output means include one sensor which is in contact with said surface at a point substantially at the center of the applied force, when the housing is lowered thereonto.

3. The arrangement as recited in claim 2 wherein said housing position control means include hydraulic means coupled to said vehicle and to a flange member, and resilient coupling means for connecting said flange member to the top end of said housing, whereby the housing is lowered and raised with respect to said surface by the lowering and raising respectively of said flange member by said hydraulic means, with the static force which is applied by said housing to the ground being a function of the housing's weight and the force applied to said housing by said flange member through said resilient coupling means.

4. The arrangement as recited in claim 1 wherein said resilient biasing means comprise a first set of air springs coupled to said vibration mass and to the lower end of said housing, and a second set of air springs coupled to said vibration mass and to the top end of said housing, said two sets of air springs controlling the null position of said vibration mass in said housing, in the absence of vibratory forces, as a function of the air pressure therein and the weight of said mass.

5. The arrangement as recited in claim 4 wherein the air springs of each set are manifolded to a source of air for controlling the relative air pressures therein.

6. The arrangement as recited in claim 4 wherein said output means include one sensor which is in contact with said surface at a point substantially at the center of the applied force, when the housing is lowered thereonto.

7. The arrangement as recited in claim 6 wherein said housing position control means include hydraulic means coupled to said vehicle and to a flange member, and resilient coupling means for connecting said flange member to the top end of said housing, whereby the housing is lowered and raised with respect to said surface by the lowering and raising respectively of said flange member by said hydraulic means, with the static force which is applied by said housing to the ground being a function of the housing's weight and the force applied to said housing by said flange member through said resilient coupling means.

8. The arrangement as recited in claim 7 wherein the air springs of each set are manifolded to a source of air for controlling the relative air pressures therein.

9. The arrangement as recited in claim 8 wherein said output means include, in addition to said one sensor, at least one additional sensor, and means for bringing said at least one additional sensor in contact with said test surface, when said one sensor is in contact with said surface, to sense the deflection of the test surface at the location of said additional sensor.

10. The method of determining deflections in a test surface, the steps comprising:
   lowering a housing supportable by a vehicle onto the the test surface, with a sensor located at the center of the housing, which comes in contact with the surface;
   measuring the deflection produced in said surface as a result of the force applied thereto by the housing resting thereon;
   vibrating a vibratory mass supported in said housing toward and away from said surface, at a selected frequency and peak-to-peak vibration amplitude; and
   measuring the deflection produced in said surface as a function of the variable forces applied to said surface by the vibration of said mass.

References Cited

UNITED STATES PATENTS 3,427,877  2/1969  Swift et al. _____ 73—146

DONALD D. WOODIEL, Primary Examiner